Figure 1:
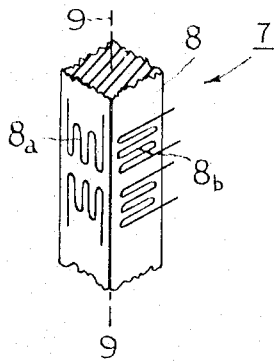

Nov. 7, 1967     D. A. SENOUR     3,350,927
NON-LINEARITY-COMPENSATED STRAIN GAGE INSTRUMENTATION
Filed May 19, 1965     2 Sheets-Sheet 1

INVENTOR
DONALD A. SENOUR
BY,
Dike, Thompson, Bronstein & Mrose
ATTORNEYS

United States Patent Office

3,350,927
Patented Nov. 7, 1967

---

3,350,927
NON-LINEARITY-COMPENSATED STRAIN GAGE INSTRUMENTATION
Donald A. Senour, Carlisle, Mass., assignor to BLH Electronics, Inc., Waltham, Mass., a corporation of Delaware
Filed May 19, 1965, Ser. No. 457,116
6 Claims. (Cl. 73—88.5)

The present invention relates to improvements in the compensation of strain gage apparatus for error-inducing non-linear effects exhibited by gaged transducers used in association with slide-wire type readout instruments, and, in one particular aspect, to novel and improved strain gage transducer instruments wherein compensatory non-linearities of reference electrical outputs developed by a potentiometer for comparison with outputs of a strain-gage bridge are promoted by simple low-cost modifying impedances.

As is well known, certain force-responsive transducers involving strain gage elements exhibit characteristic output non-linearities which are substantially parabolic deviations from the tangent to the curve of bridge output vs. load. Modification or elimination of these deviations have in the past been approached through such techniques as those involving the use of auxiliary force-responsive gages or dynamically-operated potentiometers which alter the bridge input or output circuits in corrective senses. In the interests of economy and versatility, however, the present teachings are aimed at avoiding critically-tailored modifications of the bridge circuitry and, instead, are concerned with effecting all of the desired compensating characteristics directly by way of the associated readout instrumentation. As appears more fully hereinafter, this invention uniquely overcomes non-linearity deviations, of either a positive or negative sense, by way of simple constant-current balancing-potentiometer networks incorporating shunting resistances of common inexpensive types which cause corrective parabolic functions to be generated.

It is one of the objects of the present invention, therefore, to provide novel and improved condition-responsive apparatus, such as strain gage transducer apparatus, in which inherent non-linearities are eliminated, or modified to meet predetermined requirements, via associated potentiometer-type indicating equipment.

Another object is to provide unique force-responsive strain-gage transducer apparatus in combination with servo-driven indicator equipment including variably-shunted rebalancing-potentiometer circuitry which automatically and precisely compensates for inherent transducer non-linearity.

Further, it is an object to provide rebalancing-potentiometer type indicators, for use with inherently non-linear strain-gage apparatus and the like, wherein simple low-cost resistance elements produce compensatory non-linear characteristics.

A still further object is to provide economical, uncomplicated and versatile indicating equipment, which is readily adaptable for use in compensating relationships with strain-gage transducers exhibiting different inherent non-linearities, and which utilizes common resistances to regulate current in and non-linearity of linearity-compensating potentiometer circuitry, including zero-suppression type rebalancing-potentiometer circuitry.

By way of a summary account of practice of this invention in one of its aspects, there is provided a generally-conventional form of transducer including a load-responsive column provided with strain gages which are connected in a bridge array exhibiting output voltages varying non-linearly with the applied loadings. In series opposition with the bridge output, there is applied the tapped outputs from a known form of potentiometer which is energized by a suitable power source and which tends to develop the usual substantially linear relationship between its output voltages and the mechanical positions of its wiper. A servo motor excited responsive to differences appearing between the bridge and potentiometer outputs acts to drive the potentiometer wiper to a tapping position wherein balance is preserved between these outputs, and an indicator characterizing the wiper positions thus also characterizes the transducer outputs, albeit with the aforesaid non-linearity inherently present also. In avoiding this difficulty, the potentiometer output is shunted by a fixed resistance, between the wiper and one end of the potentiometer, this resistance being of value which, taken in parallel with the resistances of the tapped portions of the potentiometer, yields a combined resistance vs. wiper position characteristic exhibiting a desired substantially parabolic curvature. Additional resistance in series with the potentiometer power source maintains the current through the partially-shunted potentiometer at a substantially constant value and thus insures that the voltages tapped from across the partially-shunted potentiometer also have a desired substantially parabolic non-linear relationship to wiper positions. Accordingly, the combined strain gage bridge and uniquely-modified potentiometer network together yield output indications which are linearly related to loading when their parabolic characteristics are matched.

Figure 2:
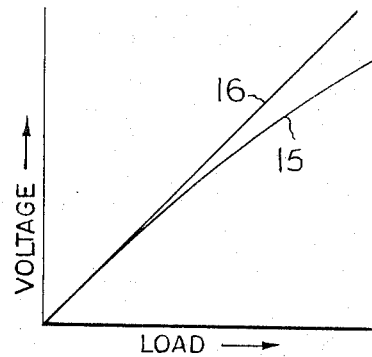
Figure 3:
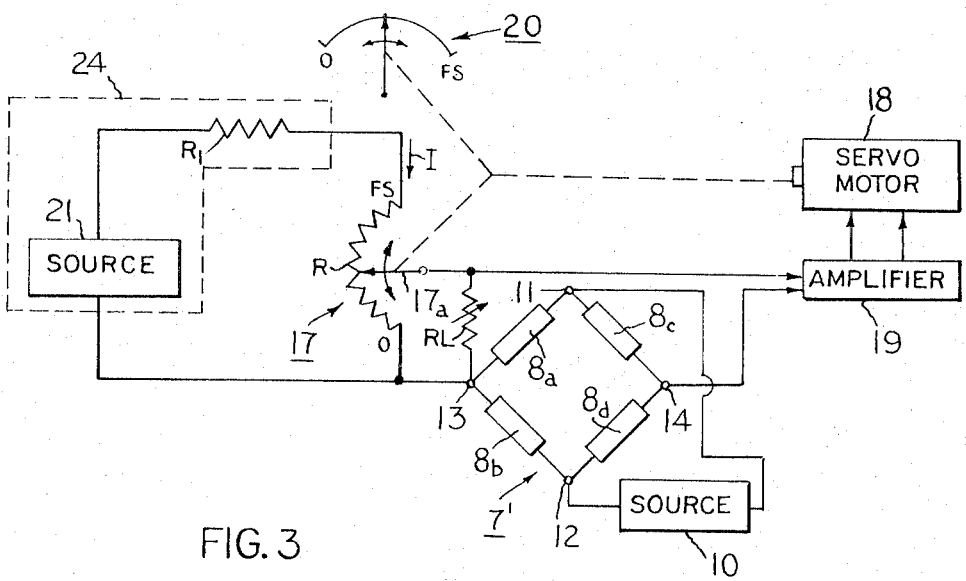
Figure 4:
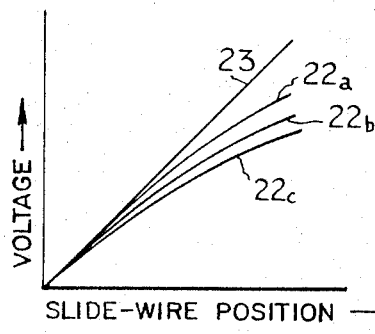
Figure 5:
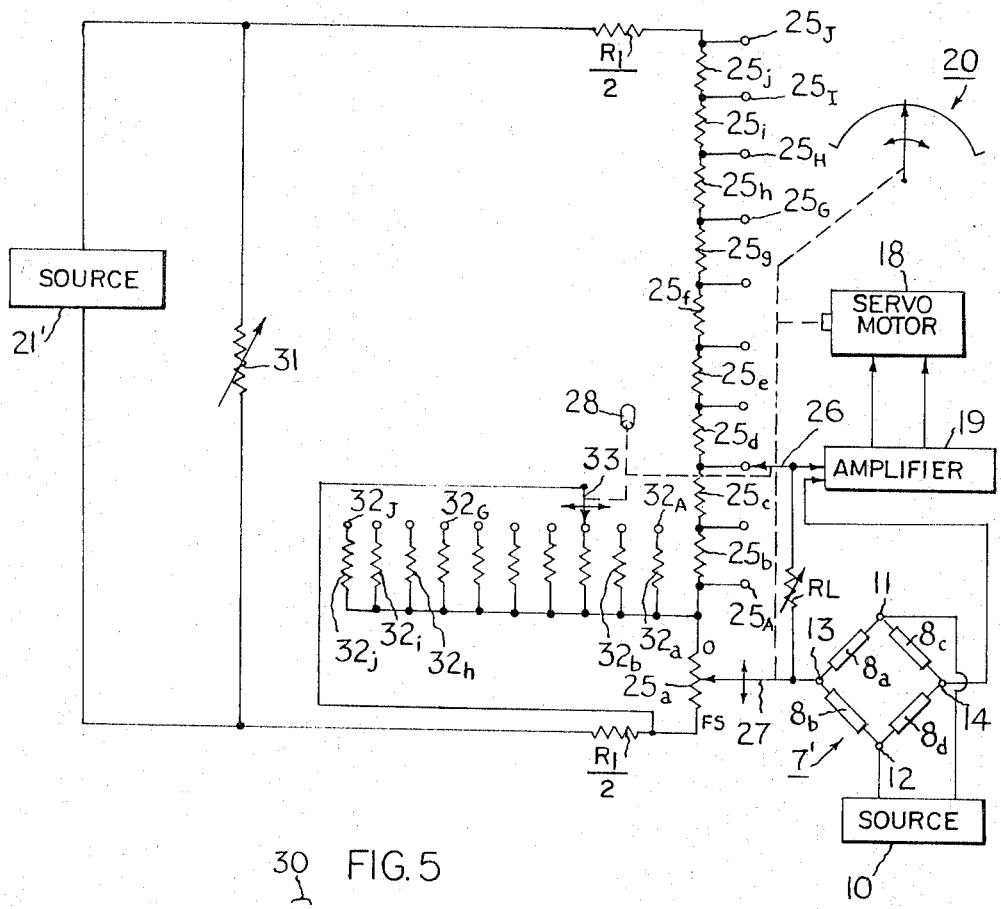
Figure 6:
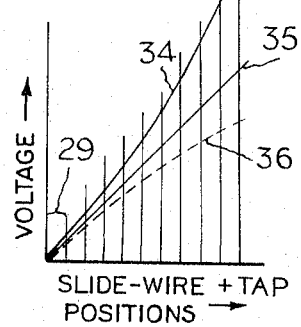

Although the aspects of this invention which are believed to be novel are set forth in the appended claims, additional details as to preferred practices of the invention and as to the further objects, advantages and features thereof may be most readily comprehended through reference to the following description taken in connection with the accompanying drawings, wherein:

FIGURE 1 is a perspective view of a portion of a transducer in the form of a load column member equipped with strain gage elements;

FIGURE 2 portrays graphically the non-linear characteristics of the output of a transducer such as that of FIGURE 1 with changing load;

FIGURE 3 expresses in schematic and block-diagram conventions one elementary embodiment of the invention;

FIGURE 4 portrays graphically the non-linear characteristics of the output of a modified readout-instrument potentiometer, such as that embodied in FIGURE 3, with different tap orientations;

FIGURE 5 is a partly schematic and partly block-diagrammed representation of a further embodiment of the invention involving zero-suppression resistance elements; and FIGURE 6 expresses graphically the output vs. slide-wire position characteristics of the modified potentiometer instrument appearing in the network of FIGURE 5.

The transducer unit 7 depicted in FIGURE 1 is of the type including a known form of elastic metal load column 8 which has an essentially square cross-section and may be subjected to loading applied along its longitudinal axis 9—9. Strain gages, such as the visible bonded electrical-resistance wire gage elements 8a and 8b, are attached to the sides of the column and are interconnected in a conventional bridge circuit relationship which yield output voltages across one diagonal when excitation voltage is applied to the other and when loading of the column is experienced. These gages, together with gages 8c and 8d which are disposed on the faces opposite those bearing gages 8b and 8a, respectively, are shown in such a bridge network in FIGURE 3, wherein an appropriate electrical power source 10 impresses input voltage upon terminals 11 and 12 to occasion load-characterizing output voltages at the bridge output terminals 13 and 14 of the transducer 7'. As is typified by exaggerated curve 15 in FIGURE 2, the values of these output voltages plotted in relation to applied load have a substantially parabolic deviation from a tangent 16 to the curve at the origin, the illustrated drooping characteristic being that for compressive loading forces. With loading in tension, on the other hand, the output curve has a well-known rising characteristic, i.e. lies above the tangent 16, and has deviations therefrom which are very nearly the same as those for the compressive loading condition.

For purposes of producing readout measurements, such as those provided by pointer indications or by recording equipment, the bridge electrical output voltages are conveniently translated into related mechanical movements, preferably automatically. The network illustrated in FIGURE 3 functions in this manner by comparing the output voltages appearing at transducer terminals 13 and 14 with the voltages tapped across a potentiometer 17 by a movable slide wire or wiper 17a actuated by a servo motor 18. Amplifier 19, of a known type and construction, responds to differences between the serially-opposed potentiometer and bridge outputs by energizing servo motor 18 to move in the senses, dictated by the senses of the differences in these outputs, which are necessary to move wiper 17a to positions where these outputs are counterbalanced. At balance, the positions of wiper 17a, or of a readout indicator 20 or the like, actuated by the mechanical movements of the servo motor 18, are supposed to characterize the loads measured by transducer 7'; however, in the system as thus far described, the non-linear outputs of the transducer strain gage bridge result in corresponding non-linear movements of the potentiometer wiper with changing loads under evaluation, and the readout on indicator 20 is thus likewise inaccurate. One may of course provide a non-linear output scale on the readout instrument which is used, but this is not a broadly useful solution because it requires expensive customized calibrations, does not suffice for measurements of both tension and compression, and does not lend itself to use for multiple-range measurements. It will be noted that the system actually shown in FIGURE 3, is not of the aforesaid conventional form, in that it further includes the two resistance elements $R_L$ and $R_1$. A common resistance $R_1$ is in series with the potentiometer electrical power source 21 and the potentiometer resistance R, and is selected to have such a high impedance (i.e. resistance) that it tends to preserve the potentiometer-circuit current I substantially constant. A common resistance $R_L$ is variably shunted across the potentiometer resistance R, by way of its connections to one end of resistance R and to the wiper 17a, and is selected or adjusted to impart the desired parabolic non-linearity in the parallel resistance combinations of $R_L$ and those portions of resistance R which are tapped by wiper 17a between the zero (0) and full scale (FS) positions as the wiper is moved upscale. Typically, a parabolic drooping of only about 1% is required, and, in the case of a potentiometer resistance R of about 160 ohms, shunting resistances $R_L$ of between about 5,000 and 30,000 ohms will yield useful parabolic compensation curves. Exaggerated curves 22a–22c in FIGURE 4 characterize the different deviations obtainable with a potentiometer shunted by progressively decreasing values of load resistance $R_L$, the tangent at the origin being designated by reference character 23. In manufacture, $R_L$ is conveniently a variable resistance, such that the desired precise non-linearity may be readily introduced to offset that of the bridge with which the instrumentation is mated. Source 21 and resistance $R_1$ together form a constant-current source 24, as is needed to aviod such sensitivity to impedance variations in the shunted potentiometer as might otherwise destroy the desired parabolic nonlinearity. With a constant current I, and a compensated potentiometer responding to that current by developing a predetermined parabolically-deviating voltage across its tapped section, the instrumentation can produce readouts which are in substantially linear relation to the loading, irrespective of the non-linear parabolic drooping characteristic of the transducer output. So-called "span" adjustments, of the zero to full-scale voltage and indicator excursions of potentiometer 17 and indicator 20, may be realized by adjustment of a variable span resistance (not shown) across source 21. The described compensation is not limited to use with the illustrated columnar-type load cell transducers and may be applied as well to other forms of transducers having substantially parabolic deviations from linearity.

FIGURE 5 represents a somewhat similar system wherein the instrumentation is of the "multi-interval" type, that is, the total measurement range is divided into equal increments each of which may be sampled and examined independently, on a single indicator scale, for example. In the illustrated system, the total range is ten times that determined by each of the ten resistances 25a–25j connected in series with the potentiometer source 21'. The same type of transducer, strain gage bridge, bridge source, amplifier, and servo motor, as were used in the system of FIGURE 1 are shown in substantially the same kind of association with the "multi-interval" system and are thus identified by the same reference characters. A separate tap (such as taps 25A–25J) is provided at one end of each of the ten resistances 25a–25j, respectively and is selectably accessible to a wiper 26 which may be indexed to each of the ten tap positions for purposes of applying the voltages developed across one or all of the nine resistances 25b–25j to the amplifier 19 in series with the voltages variably tapped from across potentiometer resistance 25a by its wiper 27. The resistance $R_L$ shunted between wipers 26 and 27 imparts the desired drooping parabolic characteristic to the output voltages derived from the wipers, in a manner and for the compensating purposes described hereinabove. Typically, $R_L$ may be between about 50,000 and 300,000 ohms in this ten-step system. Tap wiper 26 may be switched by actuation of member 28, either manually or automatically as the readings of indicator 20 run off scale into a higher range; for example, when the first tap 25A is engaged by wiper 26, the indicator will respond only to transducer signals within a first limited range 29 in FIGURE 6, and, when the wiper is moved from tap 25I to 25J, the same indicator will respond only to transducer signals within the tenth and last limited range 30 (FIGURE 6). For the intermediate tap positions, the voltages developed across selected numbers of resistances 25b–25i are in series with the voltages tapped from potentiometer resistance 25a, and the variable potentiometer output voltages being compared with the bridge output voltages thus lie within the eight illustrated intermediate ranges (FIGURE 6). Split resistances $R_1/2$, of relatively high resistance values, preserve a substantially constant-current condition through the resistances 25a–25j. Span-adjustment resistance 31 affords a control permitting the full scale of indications of instrument 20 to be matched with the measured loading conditions of the transducer 7'. For purposes of regulating the curvatures of the output voltage vs. tap- and potentiometer-wiper positions, the resistances 25a–25j are of progressively increasing values, and a further group of fixed or variable resistances 32a–32j is provided, each with a separate tap, such as taps 32A–32J, permitting its connection in shunt relationship with the potentiometer resistance 25a by movable wiper 33. The latter is mechanically coupled or ganged with wiper 26 for movements in synchronism therewith, such that taps 32A–32J, respectively, will be engaged at the same times as taps 25A–25J, respectively. Each of the resistances 25a–25j adjusts the height, and each of the shunting resistances 32a–32j controls the slope, for each of the ten segments of the composite curve 34 of voltage vs. potentiometer positions shown in FIGURE 6, and, the composite curve may thus be advantageously shaped to have the illustrated upward deviations from the tangent line 35. The latter characteristic is especially useful in connection with load cells operated in tension and exhibiting an upwardly-curving non-linearity. In the interests of versatility, all the resistances 25a–25j and 32a–

32j are pre-selected, by the manufacturer, to produce an output curve, such as curve 34, which has a curvature and slope in excess of what is expected to be necessary for its use with any transducer. Then, only resistance $R_L$ need be custom-selected or adjusted to accommodate the needs of a specific transducer. Because the shunting effects of resistance $R_L$ alone serve to impart the desired non-linearity and curve slope, the output voltages tapped across wipers 26 and 27 may thus be caused to follow an upwardly-rising characteristic like that of curve 34 on the one hand, or, on the other hand, may be caused to follow a drooping characteristic like that of dashed-line curve 36, all without requiring that the values of the sets of resistances 25a–25j and 32a–32j be specially selected or adjusted to meet the needs of any particular transducer with which the instrumentation is to be used.

The apparatus which has been described may be operated on either A-C or D-C excitations, and the sources for the potentiometer readout and bridge networks need not be entirely independent. And, in the case of manual or semi-automatic systems, the servo motor may be replaced with a null-balance type of indicator, for example. Accordingly, it should be understood that the specific embodiments and practices herein described have been presented by way of disclosure, rather than limitation, and that various modifications, substitutions and combinations may be effected without departure either in spirit or scope from this invention in its broader aspects.

What I claim as new and desire to secure by Letters Patent of the United States is:

1. Strain gage measurement apparatus comprising electrical resistance strain gage means exhibiting electrical characteristics varying non-linearly with loadings of a force-responsive member, potentiometer means having fixed and relatively movable connections between which electrical characteristics of said potentiometer means are exhibited, electrical impedance means of predetermined value connected between said fixed and relatively movable connections of said potentiometer means, said value of said impedance means being in a relation to impedance of said potentiometer means which produces a non-linearity in the electrical characteristics appearing between said fixed and movable connections with movements of said movable connection, and means for comparing said electrical characteristics of said strain gage means with said electrical characteristics appearing between said connections, whereby the positions of said movable connection are in predetermined relationship with the loadings of said force-responsive member when said electrical characteristics of said strain gage means are the same as the electrical characteristics appearing between said connections.

2. Strain gage measurement apparatus comprising an electrical resistance strain gage bridge producing output voltages which deviate substantially parabolically from a linear relationship to loading of force-responsive means, potentiometer means including resistance and relatively fixed and movable connections with said resistance, an electrical power supply forcing substantially constant current through said resistance and developing voltages across said connections, and electrical resistance means connected between said connections, said resistance means having predetermined resistance which is high in relation to said potentiometer resistance and which occasions a substantially parabolic deviation from a linear relationship of the voltages across said connections to the relative positions of said connections, the parabolic deviations of said voltages across said connections being substantially the same as those of said bridge output voltages, and means for comparing said bridge output voltages with the voltages across said connections, whereby the relative positions of said connections are substantially linearly related to said loading of said force-responsive means when said output voltages from said bridge are equal to the voltages across said connections.

3. Strain gage measurement apparatus as set forth in claim 2 wherein said power supply includes a voltage source connected across said potentiometer resistance in series with resistance high in relation to said potentiometer resistance, whereby substantially constant current is forced through said potentiometer resistance.

4. Strain gage measurement apparatus as set forth in claim 2 wherein said comparing means comprises electrical amplifier means responsive to differences between said bridge output voltages and said voltages across said connections, and electrical servo motor means energized by said amplifier means driving said movable connection to positions whereat said differences are reduced substantially to zero, and further comprising indicator means actuated by said servo motor means and thereby indicating said loading of said force-responsive means, wherein said resistance of said potentiometer means includes a plurality of serially-connected resistance elements to different portions of one of which said movable connection is made, and means for selectably making said fixed connection to different taps at ends of said resistance elements, whereby said indicator means indicates said loading of said force-responsive means over different ranges with a substantially linear characteristic depending upon the selected tap positions for said fixed connection.

5. Strain gage measurement apparatus as set forth in claim 4 further comprising a plurality of auxiliary resistance elements, and means for selectably connecting different ones of said auxiliary resistance elements in shunt relationship with said one of said potentiometer means resistance elements when said fixed connection is made to different ones of said taps, said auxiliary resistances being proportioned in relation to said one of said resistance elements to adjust to desired values the slopes of the curves of the voltages across said connections vs. positions of said movable connection.

6. Strain gage measurement apparatus as set forth in claim 5 wherein said resistance elements of said serially-connected resistance elements are of progressively increasing value in the series, and wherein said auxiliary resistance elements sequentially connected in shunt when said fixed connection is made sequentially to different ones of said taps are of progressively increasing value, and wherein the values of said resistance elements are selected to be in excess of those needed to adjust said curves to match the parabolic deviations of said bridge output voltages, whereby the impedance of said electrical impedance means serves to regulate said curves to match said deviations of said bridge output voltages.

References Cited

UNITED STATES PATENTS

| | | | |
|---|---|---|---|
| 2,561,317 | 7/1951 | Ruge | 73—88.5 X |
| 3,022,663 | 2/1962 | Diddens | 73—141 |
| 3,193,762 | 7/1965 | Wu | 73—88.5 |
| 3,224,256 | 12/1965 | Hastings | 73—88.5 |

RICHARD C. QUEISSER, *Primary Examiner.*

C. I. McCLELLAND, *Assistant Examiner.*